H. M. GRINNELL.
TRAFFIC SIGNAL FOR VEHICLES.
APPLICATION FILED OCT. 15, 1918.
1,315,301.
Patented Sept. 9, 1919.
2 SHEETS—SHEET 1.
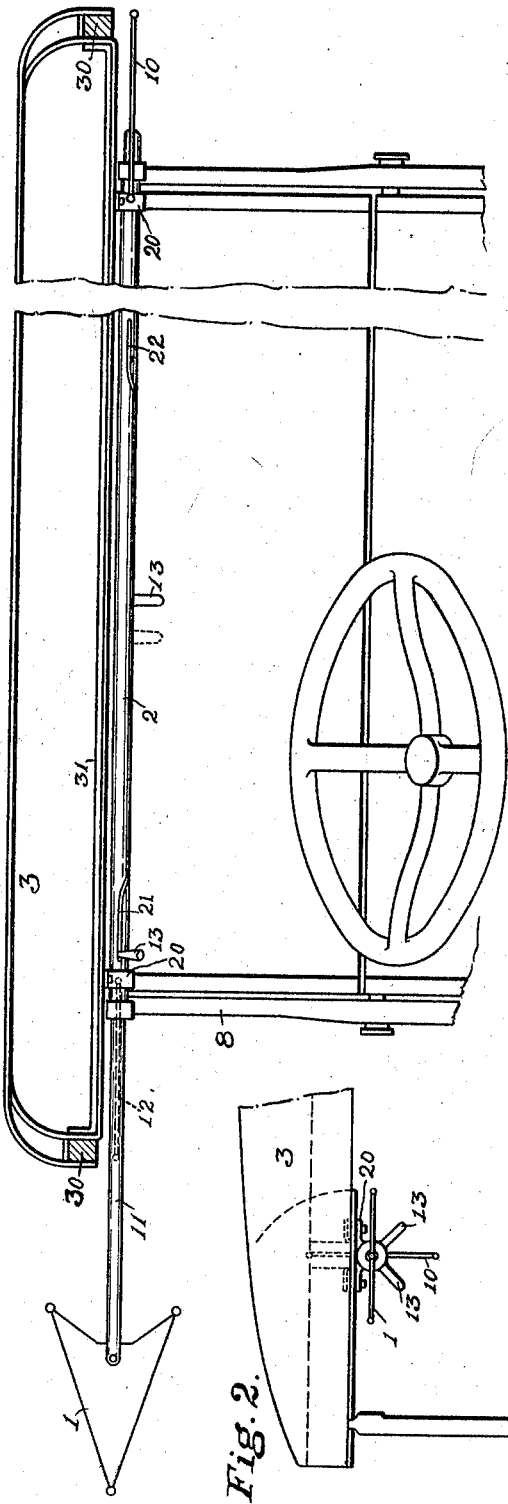
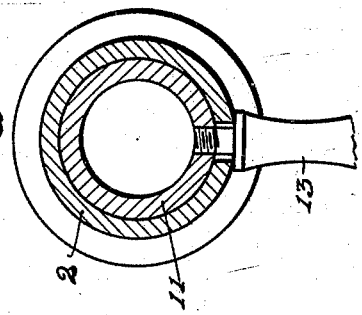
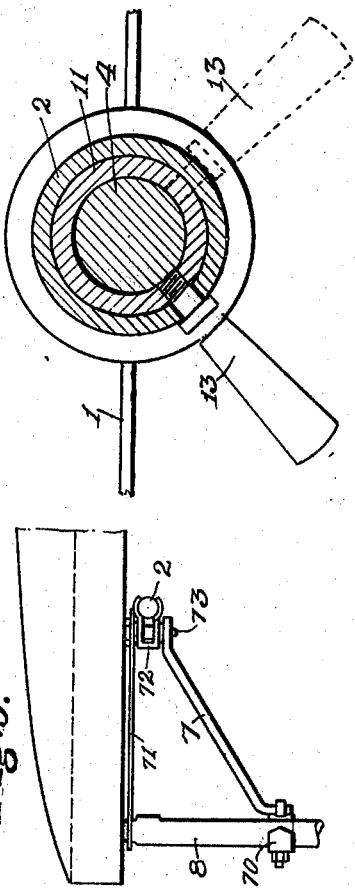
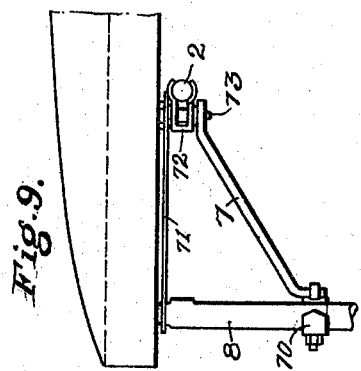
INVENTOR
Harry M. Grinnell.
BY
Henry L. Reynolds
ATTORNEY

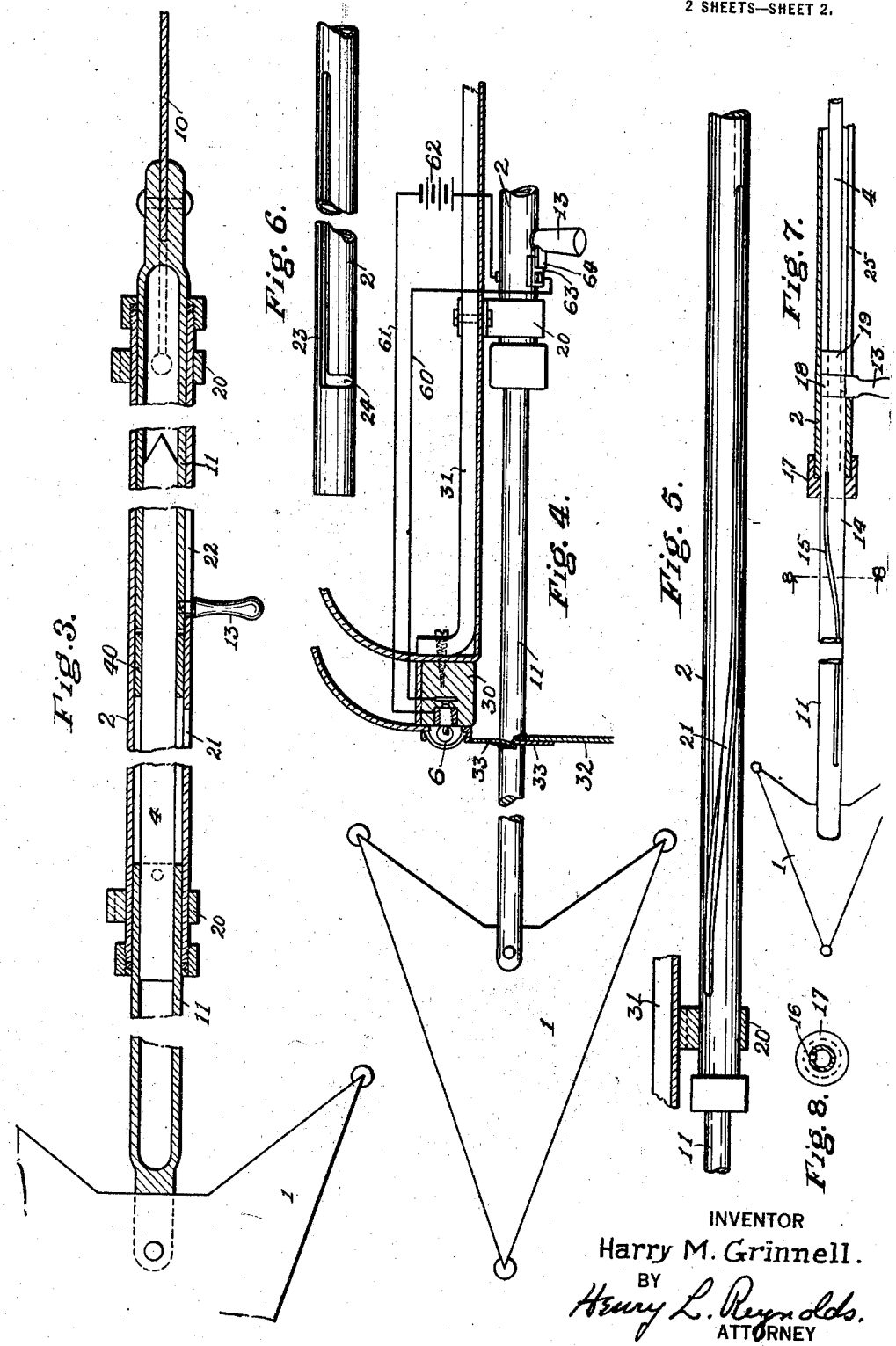

UNITED STATES PATENT OFFICE.

HARRY M. GRINNELL, OF SEATTLE, WASHINGTON.

TRAFFIC-SIGNAL FOR VEHICLES.

1,315,301. Specification of Letters Patent. Patented Sept. 9, 1919.

Application filed October 15, 1918. Serial No. 258,265.

*To all whom it may concern:*

Be it known that I, HARRY M. GRINNELL, a citizen of the United States, and resident of the city of Seattle, county of King, and State of Washington, have invented certain new and useful Improvements in Traffic-Signals for Vehicles, of which the following is a specification.

My invention relates to traffic signals and consists of a device intended for mounting upon vehicles, particularly upon automobiles, for the purpose of indicating the intention of the driver with reference to turning or stopping, and thereby to prevent possibility of collisions.

The object of my invention is to provide a device which will secure the above results and which shall be simple and cheap in construction, convenient in operation, and which may be readily installed upon machines of various makes and types of construction.

The specific features of my invention which I deem to be new and patentable will be hereinafter described and then particularly defined by the claims which terminate this specification.

In the accompanying drawings I have shown my invention in the type of construction which I now prefer.

Figure 1 is a transverse section through an automobile top, showing my invention applied thereto and its relation to the adjacent portions of the automobile.

Fig. 2 is a view of my device taken from the side of the car.

Fig. 3 is a longitudinal section through the device, showing its construction and manner of operation.

Fig. 4 is an elevation showing, on a larger scale, one end of my device and its relation to the automobile top and particularly the manner in which I have provided for withdrawal and extension of the target when the side curtains are in use.

Fig. 5 is an exterior view of the main tube showing the character and extent of one of the guiding slots.

Fig. 6 is a view of a portion of a similar tube showing a modified manner of constructing the guiding slot.

Fig. 7 is a longitudinal section showing another modified type of construction in which the guiding and turning member for the target is placed on the target stem.

Fig. 8 is a section taken on the line 8—8 of Fig. 7.

Fig. 9 is a view from the side of the automobile showing an alternative manner of mounting the same from a wind shield instead of an automobile top, as in Figs. 1 and 2.

Fig. 10 is a cross section of the device taken at the point of applying one of the operating handles to the reciprocating target carrying stem.

Fig. 11 is a similar section of the opposite end of the device.

The type of target which I have chosen consists of a plate 1, herein shown as in the form of a conventional arrow head, although the outline thereof might be anything desired, which head is mounted upon a stem 11 mounted in suitable guides so as to be reciprocated. I provide a second target 10, mounting one of these at one side of the automobile and the other at the opposite side and when it is desired to give a signal to others upon the road of an intention to turn in one direction or the other, the corresponding target is projected so as to show plainly from both front and rear, as does the target 1 in Fig. 1, thereby giving warning which would prevent probability of collision and also indicating to traffic officials the intended course.

When in use the targets 1 and 10 are projected and occupy vertical planes. When not in use they are withdrawn so as to lie within the outer margins of the automobile top and to occupy horizontal planes, as is shown by the target 10 in Fig. 1, and by dotted lines at 12, for the other target.

A tube 2 is provided of a size within which the stems 11 of the targets may snugly fit and slide. This tube 2 is of such a length that, with the targets in withdrawn position, the total length of the tube and the targets is not greater than the width of the automobile top. While this is a condition which I much prefer to secure, for the reason that the targets are then more fully out of sight and also are protected from the rain, it is, however, not strictly an essential condition. While the targets might project outside of the top at all times, I much prefer to have them entirely under the top when withdrawn.

The tube 2 is shown in Fig. 1 as being secured by means of a clamp 20 to a bar 31 which extends across the automobile top and connects the two side bars 30 of said top. This positions the tube 2 under and close to the bars 30 of the top.

The tube 2 is provided with a slot 21 extending lengthwise thereof, through which a handle, as 13, passes and is secured to the stem 11 of the target. This slot 21 has a portion thereof on an incline, this inclination being of such an extent as to turn the target stem 11 through an angle of 90°, during the course of the reciprocation between the outer and inner positions thereof. Preferably this inclined portion of the slot is adjacent to the end thereof which is toward the end of the tube. It is evident that the reciprocation of the target will cause a quarter turn thereof and with the inclined portion of the slot positioned as described, this quarter turn will take place near the outermost position of the target. In consequence, when the handle 13 is pushed inward, the target 1 will be turned into a horizontal position and then pass beneath the top 3.

The stem 11, which is at the side of the car occupied by the driver, is shorter than the corresponding stem which is at the opposite side of the car. The purpose of this is to get the handles for operating both targets conveniently placed in front of the driver. One result of this is that the inner end of the stem 11 will have a comparatively short bearing in the tube 2, when the target is projected.

To give this target a somewhat better support when projected, I have shown a rod 4 as secured within the inner end of the tube 11. This rod passes through a sleeve 40 which is secured in fixed position within the tube 2, at a point such that the inner end of the rod 4 will not be withdrawn therefrom when the target 1 is projected. This rod 4 enters the inner end of the tube 11 for the other target when this target is drawn inward. By this expedient the two handles 13 for both targets may be placed close together in front of and close to the operator where he may conveniently engage either one.

In Fig. 6 I have shown a modification in the construction of the guiding slot in the tube 2. In this case the slot 23 is straight, without a spiral twist. At one end it, however, has a side extension 24 which permits turning of the handle 13 through the necessary angle to properly display the target when it is out. This side extension is not for the purpose of locking the target against movement.

In Figs. 7 and 8 I have indicated a modification of construction in which the slot 25 in the outer tube 2 is straight throughout its length. The stem 14 of the target is provided with a guiding and turning member which may be a slot 15 in the stem 14 or a projecting rib, which has a quarter turn incline therein which has a guiding projection and engagement with either a key or a slot 16, which forms a part of a collar 17, which latter is secured to the end of the tube 2.

In this type of construction a sleeve or collar 18 is placed about the rod 4 and is free to turn thereon, while a short sleeve or collar 19 is secured to the rod 4. Therefore, the stem 14 may have a turning movement relative to the handle 13.

In connection with this signal I may provide a small electric light, as 6, which may be mounted at such point as to illuminate the target when it is projected. I have shown the current carrying leads 60 and 61 as extending to a battery 62, one of these being electrically connected with the tube 2 and the other to a contact block 63, which is carried by, but insulated from, the rod 2. A contact blade 64, carried by the handle 13, makes contact with the block 63 when the target is projected, and thus illuminates the target only when it is projected.

In Fig. 9 I have shown an alternative form of mounting. In this case the tube 2 is secured in the same relative position by means of a bracket having an arm 7 which is secured by a clamp, as 70, to a side bar of a wind shield 8. This is braced by an arm 71 which is also secured to the wind shield and the tube is held in place by means of a clamp 72, which is compressed by bolts 73. The particular mechanism for securing the device in place upon the car may be varied as necessary.

In Fig. 4, 32 represents one of the side curtains. For withdrawal of the target within the curtains, it is necessary to provide an opening in the upper part of the curtain of sufficient size to permit its passage. This may be closed by providing two small flaps 33, which join and overlap on the plane of the target and which will yield freely to permit passage of the target.

The operation of the device is evident. With the targets withdrawn, if it is desired to turn to the left the driver will reach upward and throw the target toward the left. It is impossible to operate the wrong target as the targets will not move from their innermost position in any direction except outwardly. After the turn has been accomplished, the handle is engaged and thrown back to its normal position. This may be conveniently done for both sides and after being done leaves both hands free for handling the car.

The device, when attached to a car, is not particularly noticeable and not at all objectionable. The target stays in whichever position it is set and the parts may all be made so that, while they will operate freely, there must be no rattling.

The particular construction employed which includes the slot in the tube and the operating handle passing through the slot and secured to the target stem, contributes both to simplicity and cheapness of manufacture and places the operating handles in a convenient position for engagement by the driver.

What I claim as my invention is:

1. In a traffic signal the combination with a tubular member adapted to extend transversely across a vehicle top and having slots formed therein adjacent its outer ends, signal carrying members slidably and rotatably disposed in the tubular member and having telescopic engagement with each other, a handle projecting from each of the signal carrying members through the slots of the tubular member, one of said signal carrying members being materially shorter than the other, and the shape of the slots being such as to impart a turning movement to the signal carrying members.

2. In a traffic signal the combination with a tubular member adapted to extend transversely across a vehicle top and having slots formed therein adjacent its outer ends, of signal carrying members slidably disposed in the tubular member and having telescopic engagement with each other, a handle projecting from each of the signal carrying members through the slots of the tubular member, one of said signal carrying members being materially shorter than the other to bring both of the handles materially nearer one end of the tubular member than the other.

Signed at Seattle, Washington, this 7th day of October, 1918.

HARRY M. GRINNELL.

Copies of this patent may be obtained for five cents each, by addressing the "Commissioner of Patents, Washington, D. C."